(12) United States Patent
Glock

(10) Patent No.: US 8,173,101 B2
(45) Date of Patent: May 8, 2012

(54) METHOD FOR REMOVAL OF HEAVY METALS

(76) Inventor: Gaston Glock, Velden (AT)

( * ) Notice: Subject to any disclaimer, the term of this patent is extended or adjusted under 35 U.S.C. 154(b) by 33 days.

(21) Appl. No.: 12/309,027

(22) PCT Filed: Jul. 4, 2006

(86) PCT No.: PCT/AT2006/000284
§ 371 (c)(1),
(2), (4) Date: Dec. 9, 2009

(87) PCT Pub. No.: WO2008/003101
PCT Pub. Date: Jan. 10, 2008

(65) Prior Publication Data
US 2010/0086479 A1    Apr. 8, 2010

(51) Int. Cl.
*C01B 33/36* (2006.01)
(52) U.S. Cl. .......................... 423/700; 423/713
(58) Field of Classification Search ................... 423/700, 423/713
See application file for complete search history.

(56) References Cited

U.S. PATENT DOCUMENTS 5,098,685 A * 3/1992 Casci et al. .................... 423/708
5,500,193 A * 3/1996 Benson et al. ................. 423/157

* cited by examiner

*Primary Examiner* — Melvin Mayes
*Assistant Examiner* — Melissa Stalder
(74) *Attorney, Agent, or Firm* — X-Patents, APC

(57) ABSTRACT

The invention relates to a method for removing heavy metal ions from the lattice of tectosilicates or phyllosilicates, especially from zeolite mineral, particularly clinoptilolite, by exchanging ions with calcium ions. According to the inventive method, the zeolite rock is brought in contact with hydrochloric and ammonium-containing solutions in a chain of exchange reactors such that a large part of the cations of the lattice are replaced with ammonium ions, and the ammonium ions located in the lattice are replaced with calcium in a basic calcium hydroxide solution. The ammonium or ammonia used in the process is conducted in the circuit by binding the same in hydrochloric acid as an ammonium ion from the exchange solutions by conveying anhydrous ammonia and can be fed back to the exchange solution. The ions from the lattice that are exchanged are essentially precipitated as phosphate, carbonate, or hydroxide.

5 Claims, No Drawings

METHOD FOR REMOVAL OF HEAVY METALS

The invention concerns a method for the removal of heavy metals from tectosilicates or phyllosilicates, especially from zeolite and in particular from natural zeolite such as clinoptilolite or primarily zeolites containing clinoptilolite, or also from other synthetic zeolites with comparable ion selectivity.

Tectosilicates or phyllosilicates, but in particular natural zeolites containing clinoptilolite, are obtained in large quantities throughout the world at different sites and, after a milling process, are used, for example, as a feed additive or as a food additive. It is specifically the use in the area of foodstuffs that makes it necessary to reduce or remove the heavy metal ions with which the rock is naturally laden. Up to now, such a reduction or removal has not been possible.

It is the goal of the invention to provide a method through which the heavy metal load can be significantly reduced and, if desired, practically eliminated. Before the inventive solution is gone into, some of the properties of zeolite that are significant for the inventive method will be explained through the example of clinoptilolite, whereby these properties are also present, however, to a different extent with other tectosilicates or phyllosilicates.

The mineral clinoptilolite is a tectosilicate with the crystallographic structure of heulandite, the composition of which essentially corresponds to the formula $$(Na,K)(x-2y)(Ca,Mg)y(Al_xSi_{(36-x)}O_{72}) \cdot 24H_2O \qquad (1)$$

With this, in addition to calcium and magnesium ions, divalent heavy metal ions such as lead, barium, strontium, and cadmium are also embedded, and in addition to sodium and potassium, monovalent heavy metal ions such as cesium and rubidium are also embedded. The crystallographic silicon-aluminum relationship for clinoptilolite is Si/Al>4 and is typically in the range of Si/Al>4.

The structure of zeolite is based upon a three dimensional cross-linking of SiO4 tetrahedrons that are connected by means of the oxygen atoms. Within that context, a portion of the silicon atoms are replaced by aluminum atoms. The framework structure contains regular pores and channel systems.

The negative charges of the silicon-aluminum tetrahedron are compensated by positive monovalent and divalent ions as well as by water.

The channel systems with free diameters of up to 0.44-0.72 nanometers allow the penetration by ions and molecules and thus give the zeolite its ion-exchange properties.

Greater detail about the channel system and the chemical properties is to be found in the book *Silikatchemie* by Petzold and Hinz, Stuttgart: Ferdinand Enke Verlag, 1979. The inventive method is based upon the consideration of using the high selectivity of the mineral for larger ions, in particular ammonium, with regard to the absorption of ions:

$$NH_4^+ > K^+ > Mg^{2+} > Ca^{2+} \qquad (2)$$

$$Cs^+ > Rb^+ > K^+ > NH_4^+ > Sr^{2+} > Na^+ > Ca^{2+} > Fe^{2+} > Al^{3+} > Mg^{2+} \qquad (3)$$

$$Pb^{2+} > Cd^{2+} > Ba^{2+} > Sr^{2+} > Ni^{2+} \qquad (4)$$

As a result of the high selectivity of the mineral clinoptilolite and of zeolites in general (but also of other tectosilicates or phyllosilicates) for ammonium as a non-heavy metal ion, this ion takes on a particular importance with the ion exchange.

The invention is based upon creating a method with which by means of an ion exchange exclusively in an aqueous solution, a removal of heavy metals is achieved. Within that context, the crystalline structure of the tectosilicates or phyllosilicates, in particular of the zeolite, is not impaired, as this would occur, for example, by heating to a temperature of over 400° C. with the release of ammonia. For the purpose of easy readability, the discussion below is only of "zeolite", but with this, the other tectosilicates or phyllosilicates are also likewise meant.

Natural zeolites are viewed to be in particular those listed by Passaglia and Sheppard in *Reviews in Mineralogy and Geochemistry*, 2001, Vol. 45, pages 70 and 71: analcime, wairakite, tschernichite, bikitaite, boggsite, brewsterite, chabazite, willhendersonite, dachiardite, bellbergite, edingtonite, epistilbite, erionite, faujasite, ferrierite, gismondine, garronite, gobbinsite, amicite, gmelinite, goosecreekite, heulandite, clinoptilolite, laumontite, levyne, lovdarite, perlialite, mazzite, merlinoite, mutinaite, montesommaite, mordenite, maricopaite, natrolite, mesolite, scolecite, gonnardite-tetranatrolite, gottardiite, offretite, partheite, paulingite, phillipsite, harmotome, roggianite, stilbite, stellerite, barrerite, terranovaite, thomsonite, yugawaralite, cowlesite, and tschörnerite.

In the inventive process, nearly all of the ions that are bound in the zeolite are replaced in the first two steps of the process by ammonium ions. The ions with an even stronger binding force in the zeolite lattice such as cesium or rubidium are likewise transferred by the selected high salt concentration to the exchange solution. By means of the regeneration of the solution and the repeated circulation through the specimen, a higher and higher heavy metal ion gradient of the rock in the solution is maintained. It is furthermore possible to extract heavy metals from the rock by means of complexation (for example, with EDTA).

In the first step, the zeolite rock comes into contact with 0.1 M hydrochloric acid; unless stated otherwise, "M" here and in the entire description and the claims stands for "molar". It is furthermore to be intended that this solution be enriched with ammonium salt (for example, 5 M NH4Cl). In that context, easily exchangeable ions such as calcium ions are to a large extent released from the zeolite lattice, and in addition, acid-soluble secondary components are attacked and brought into solution. The treatment with a hydrochloric acid solution with a pH value of 1 is particularly significant with respect to use as a foodstuff additive, where the material is exposed to a comparably acidic environment in gastric juices. After this step, the zeolite is neutralized by passing through a lightly basic ammoniac solution.

In the second step, the nearly complete total exchange is carried out through the use of concentrated ammonium salt solutions (for example, 5 M. NH4Cl) in a series of reactors. Aside from ammonium ions, a portion of potassium ions remains as a result of the comparable selectivity in the lattice. The exchange can be carried out at room temperature, but also under an increased temperature and/or under pressure, whereby the solution flows from one reactor to the next corresponding one, and consequently the reactor with the most completely exchanged zeolite has the heavy metal-free solution run through it. The exchange solution is intended for regeneration by means of heavy metal precipitation.

Through the use of equation (1), the ammonium exchange is represented in principle in such a way that the zeolite takes on the following total formula:

$$(K,NH_4)x(Al_xSi_{(36-x)}O_{72}) \cdot 24H_2O \qquad (5)$$

In the third step (the ammonium-calcium exchange), the ammonium ions that are bound in the lattice are removed by increasing the pH value of the solution according to:

$$NH_4^+ + OH^- \rightarrow NH_3\uparrow + H_2O \qquad (6)$$

whereby calcium is available as an exchange ion. For this, a saturated calcium hydroxide and calcium chloride solution flows through the reactor. The ammonia that is released as a result of the high pH value of the solution is separated from the solution by means of ammonia stripping with inert gas and discharging into a 5 M hydrochloric acid solution in the inert gas loop. The ammonium that is bound in the zeolite lattice is in this way successively replaced by calcium ions.

Through the use of equation (1), the total exchange is represented in principle in such a way that the zeolite takes on the following total formula:

$$K_{(x-2y)}Ca_y(Al_xSi_{(36-x)}O_{72}).24H_2O \qquad (7)$$

After the exchange by means of the inventive method, potassium and calcium are typically in a ratio of approximately 5:1; thus, for the total formula with Si/Al=5, what results is:

$$K_{0.54}Ca_{2.73}(Al_6Si_{30}O_{72}).24H_2O \qquad (8)$$

In the fourth through sixth steps, the product which is still strongly basic and soaked with chlorides and calcium hydroxide is neutralized in reactors of the rinse cycle, washed, dried, and finally packed.

The fourth method step can be provided in two variants:

1) A calcium chloride solution with a pH value in the range from 5 to 6 (addition of HCl) flows through the reactor until a pH value of 7-8 is adjusted in the rinsing water.

2) Carbon dioxide gas or an aqueous solution that has been mixed with carbon dioxide flows through the reactor until by means of a bonding of the alkaline solution as calcium carbonate, a pH value of 7-8 is set in the runoff end.

In the fifth step (chloride-free washing), the zeolite rock is rinsed with deionized water in order to wash out of the rock the remaining chloride ions and the calcium ions that are not bound in the lattice. The deionized water is supplied by a reverse osmosis system.

In the sixth step (drying), the zeolite rock is dried at a temperature of 105° C. in the gas flow. The moisture that is given off from the zeolite rock is separated out of the gas flow in a separator. The dried granular material is then removed from the reactor and packed.

One part of the inventive method that is essential in the economic respect is a broad reaching regeneration and reuse of the chemicals and exchange solutions that are used. Consequently, with regard to the effects upon the environment, as well, only a small discharge of ammonium in the waste water can be taken into account. The exchange solutions described below are provided for the regeneration:

1) The acid wash solution from step 1 is regenerated through ammonia release by means of the addition of CaCO3, Ca(OH)2, or CaO and ammonia stripping with inert gas and discharging into a 5 M hydrochloric acid solution in the gas loop. Exchanged heavy metals are precipitated through the use of an alkaline environment as carbonate or hydroxide.

The aqueous residue consists essentially of calcium chloride and sodium chloride; the solid residue of calcium and magnesium carbonate, other carbonates and hydroxides, and zeolite sludge from the abrasion of particles.

2) The ammonium salt solution in the third step is enriched through repeated use, especially with alkali ions. Depending upon the degree of consumption, two possibilities are available for the regeneration for the reuse of the ammonium salt solution:

The ammonium chloride solution that is very heavily loaded with alkali ions, alkaline earth ions, and heavy metal ions is regenerated through ammonia release by means of Ca(OH)2 or CaO and ammonia stripping with inert gas and discharging into a 5 M hydrochloric acid solution in the gas loop. The aqueous residue consists essentially of calcium chloride and sodium [chloride], and potassium chloride; the solid residue of calcium and magnesium carbonate, other carbonates, and hydroxides.

With solutions with a low degree of consumption, a precipitation of the troubling ions is carried out. The regeneration takes place by means of the precipitation of calcium, magnesium, and the heavy metals as phosphate, carbonate, hydroxide, sulfate, sulfide, and the separation of the precipitates by means of a suitable filter (filter centrifuge). Since the phosphates were added in the excess, these are removed with yet another precipitation with iron (III) chloride and the precipitation of the precipitated iron phosphate. In that context, the excess iron is likewise removed as precipitated Fe(OH)3 or as FeOOH. The precipitated products thus essentially contain calcium phosphate and magnesium phosphate in which heavy metals are bound. Aside from this, iron phosphate and iron hydroxide accumulate from the second step.

3) The calcium hydroxide solution and calcium chloride solution in the third step (ammonium-calcium exchange) is renewed by means of a slurry of Ca(OH)2 or CaO. Added calcium chloride is not used. As a result of contact with the carbon dioxide in the air, a precipitate of calcium carbonate is formed which must occasionally be removed.

4) The acidified rinsing solution in the fourth step for the neutralization (acidified CaCl2) is adjusted by means of the addition of hydrochloric acid in a pH value range of 5-6. With the use of carbon dioxide as a neutralizing agent (carbonatization), the solution is placed under pressure with carbon dioxide.

5) The water that is used for the chlorine-free washing in the fifth step is supplied by a reverse osmosis filter membrane in the loop.

6) The ammonium recovery from steps one to three of the process takes place by means of passing the ammoniac gas through a diluted hydrochloric acid (for example, 5 mol/l). The ammonium chloride solution that is created from this through the course of the process can immediately contribute to the renewal of the exchange solution.

As waste products of the entire process, therefore, what accumulates is only aqueous solutions of alkali and alkaline earth chlorides, alkaline earth phosphates with heavy metals bound in them, and iron phosphate or iron hydroxide.

Therefore, according to the invention for the removal of heavy metal ions from the lattice of zeolite material and the replacement of them by calcium ions by means of ion exchange, the method consists, in a greatly summarized fashion, of zeolite rock in a chain of exchange reactors being brought into contact with hydrochloric acid solutions and solutions containing ammonium chloride, with which the lattice cations are to a large extent replaced by ammonium ions, the ammonium ions which are then located in the lattice being exchanged in a basic calcium hydroxide solution by calcium, and the ammonium or ammonia that is used in the process being led to the loop such that from the exchange solutions, it is bound as an ammonium ion in hydrochloric acid through ammonia gas transport and can be supplied once again to the exchange solution. The ions that have been exchanged from the lattice are essentially precipitated as phosphate, carbonate, or hydroxide.

The following examples should explain the method according to the invention in greater detail.

EXAMPLE 1

A pilot system is divided into two process parts:

First part: exchange reaction consisting of a system component 1 with five reactors and seven containers for solutions. The zeolite rock to be exchanged is poured into the reactor 1 for washing with acid, is conducted from that to the reactor group 2 for the ammonium exchange, and from that to reactor 3 for the ammonium-calcium exchange, each time by means of suction lines, and three process steps run in succession in the reactors in which the exchange solutions run through.

Second part: neutralization, washing, drying, packing/storage. The zeolite rock is conducted from the reactor 3 to the reactor group 4 by means of a suction line. Three process steps run in succession in the reactors and serve for the neutralization, washing, and drying. These comprise the treatment with acidified solutions ($CO_2$—current, carbonic acid solution, or HCl solution) for the lowering of the pH value, a chloride-free washing, drying, and packing or storage.

The solutions are found in:

A. acid washing: a storage tank for hydrochloric acidic 5 molar ammonium chloride exchange solution with a pH value of 1, as well as a container with water for the subsequent neutral washing (addition of ammonia);

B. removal of heavy metals: a storage tank for a 5 molar ammonium chloride exchange solution;

C. precipitate container: a precipitate container and a temporary container for phosphate precipitate (for example, calcium phosphate, lead phosphate, or barium phosphate);

D. ammonium-calcium exchange: a container for calcium hydroxide slurry and calcium chloride;

E. neutral washing: a container with a calcium chloride solution with a pH value of 4 to 5;

F. rinsing: a rinsing container with deionized water and a reverse osmosis system;

G. ammonia separation: a container with 5 molar hydrochloric acid.

Process step—first part, ion exchange:

In continuous operation, the reactors each contain 100 kg. of zeolite rock with a grain size of 0.5 to 1 mm. in different stages of the ion exchange. The reactors are connected with each other and with the storage tanks by means of pipelines with valves, such that the different ion exchange solutions flow through them in a freely selectable order.

In the first step (acid washing), the reactor is filled with 100 kg. of zeolite rock and subsequently solution A (5 M $NH_4Cl$, pH value of 1) flows through it for 24 h with a temperature of 80° C.

In the second step (the removal of heavy metals), the rock stays for 4 days, during which solution B (5 M $NH_4Cl$, at 80° C.) flows through four reactors successively, such that the solution that has already been enriched with heavy metal ions, alkali ions, and alkaline earth ions from the previous reactors flows into the reactor that is new in line. The reactor is then successively moved up and, in the last partial step, the pure or regenerated ammonium chloride solution flows into it.

In the third step (the ammonium-calcium exchange), a saturated calcium hydroxide and calcium chloride solution flows through the reactor. The ammonia that is released as a result of the high pH value of the solution is separated from the solution by means of ammonia stripping with inert gas and discharging into a 5 M hydrochloric acid solution in the gas loop. The ammonium that is bound in the zeolite lattice is in this way successively replaced by calcium ions.

Process step—second part; neutralization, washing, drying, packing:

In continuous operation, the reactors each contain 100 kg. of zeolite rock with a grain size of 0.5 to 1 mm, the ion exchange has been complete, and the zeolite lattice is loaded with calcium ions. The reactors are connected with each other and with the storage tanks by means of pipelines with valves, such that the different ion exchange solutions flow through them in a freely selectable order.

In the fourth step (neutral washing), a calcium chloride solution with a pH value in the range from 4 to 5 (addition of HCl) flows through the reactor until a pH value of 7-8 is adjusted in the rinsing water.

In the fifth step (chloride-free washing), deionized water flows through the reactor in order to wash out of the rock the remaining chloride ions and the calcium ions that are not bound in the lattice. The deionized water is regenerated by means of a reverse osmosis system.

In the sixth step (drying), hot air or carbon dioxide at a temperature of 105° C. flows through the reactor and thus dries it. The moisture that is given off from the zeolite rock is separated out of the gas flow in a separator. The dried granular material is then removed from the reactor and packed or stored.

The exchange solutions can be regenerated as follows:

A. Acid wash solution: regeneration through ammonia release by means of $Ca(OH)_2$ or CaO and ammonia stripping with inert gas and discharging into a 5 M hydrochloric acid solution in the inert gas loop. The residue consists of essentially calcium chloride and zeolite sludge from the abrasion of the particles.

B. Ammonium salt solution: regeneration through ammonia release by means of $Ca(OH)_2$ or CaO and ammonia stripping with inert gas and discharging into a 5 M hydrochloric acid solution in the gas loop. Or regeneration by means of heavy metal precipitation as phosphate/carbonate and separation by means of running through a filter centrifuge and precipitation of the precipitate. Subsequent precipitation of the phosphates that were added in the excess by means of precipitation with iron (III) chloride and the precipitation of the precipitated iron phosphate.

D. Ammonium-calcium exchange: the calcium hydroxide solution is renewed by means of an additional slurry of $Ca(OH)_2$ or CaO.

EXAMPLE 2

The pilot system is built analogously to Example 1

As exchange solution D, however, a pure calcium hydroxide solution is used. Instead of exchange solution E, the zeolite is gassed with carbon dioxide or else carbon dioxide-enriched water flows through it until a pH value of 7-8 is reached.

The following process steps and solutions which are used differ from those of Example 1:

In the third step (the ammonium-calcium exchange), a saturated calcium hydroxide solution flows through the reactor. The ammonia that is released as a result of the high pH value of the solution is separated from the solution by means of ammonia stripping with inert gas and discharging into a 5 M hydrochloric acid solution in the gas loop. The ammonium that is bound in the zeolite lattice is in this way successively replaced by calcium ions. In this case, the exchange solution does not need to contain any chloride, since the neutralization process that subsequently occurs takes place with carbon dioxide. By means of this, the chloride load is reduced.

In the fourth step (neutralization), carbon dioxide gas or an aqueous solution that has been enriched with carbon dioxide flows through the reactor until by means of a bonding of the base as calcium carbonate, a pH value of 7-8 is adjusted. The addition of calcium carbonate in the rock that is caused by this is unproblematic.

The solutions are found in:

D. Ammonium-calcium exchange: a container for calcium hydroxide slurry;

E. neutralization: neutralization with carbon dioxide, transformation of calcium hydroxide residues into calcium carbonate.

The exchange solutions are regenerated as in Example 1.

The invention is not restricted to the embodiments that have been explained, but rather it can be repeatedly modified, in particular, in consideration of each of the heavy metals that is present and their content.

The reactors can have a different size than that which has been provided; by means of changes in the flow speeds and possibly by means of the creation of turbulent flow with improved transportability of the ions that are to be exchanged, the contact times can be changed and in particular shortened.

Essentially, the zeolite rock is inventively brought into contact in a chain of exchange reactors with hydrochloric acidic solutions and solutions containing ammonium, in the context of which the lattice cations are replaced to a large extent by ammonium ions, and the ammonium ions that are located in the lattice are then exchanged in a basic calcium hydroxide solution for calcium. The ammonium or ammonia that is used in the process is conducted to the loop such that from the exchange solutions, it is bound as an ammonium ion in hydrochloric acid through ammonia gas transport and can be supplied once again to the exchange solution. The ions that have been exchanged from the lattice are essentially precipitated as phosphate, carbonate, or hydroxide.

The invention claimed is:

1. A method for the removal of heavy metal ions from zeolite, the method comprising:
    (a) exposing the zeolite to a solution of hydrochloric acid enriched with ammonium salt that is sufficiently acidic to release exchangeable ions from the zeolite lattice;
    (b) neutralizing the zeolite;
    (c) exposing the zeolite to a plurality of ammonium salt solutions in a series of reactors to obtain a substantially complete replacement of exchangeable ions in the zeolite lattice by ammonium ions;
    (d) exposing the zeolite to a saturated calcium hydroxide and calcium chloride solution in a reactor to obtain a substantially complete replacement of the ammonium ions in the zeolite lattice by calcium ions;
    (e) decreasing the pH of the zeolite to a substantially neutral value; and
    (f) rinsing the zeolite with deionized water.

2. The method of claim 1, wherein the temperature of the ammonium salt solutions is increased to increase the ion exchange rate.

3. The method of claim 1, wherein the reactor pressure during exposure to the ammonium salt solutions is increased to increase the ion exchange rate.

4. The method of claim 1, wherein the pH of the zeolite is decreased to a substantially neutral value by introduction of a calcium chloride solution with a pH in the range of 5 to 6.

5. The method of claim 1, wherein the pH of the zeolite is decreased to a substantially neutral value by introduction or carbon dioxide as a as or in solution.

* * * * *